(12) United States Patent
Leung et al.

(10) Patent No.: US 6,431,057 B1
(45) Date of Patent: Aug. 13, 2002

(54) TOASTER

(75) Inventors: Chi Wah Leung; Chi Chung Fung; Shek Chuen Luk, all of Hong Kong (HK)

(73) Assignee: Simatelex Manufactory Co., Ltd., Hong Kong (HK)

( * ) Notice: Subject to any disclaimer, the term of this patent is extended or adjusted under 35 U.S.C. 154(b) by 0 days.

(21) Appl. No.: 10/039,298

(22) Filed: Jan. 2, 2002

(51) Int. Cl.[7] .................................................. A47J 37/08
(52) U.S. Cl. .................... 99/326; 99/329 P; 99/329 RT; 99/331; 99/385; 99/389; 99/391
(58) Field of Search ........................... 99/326–333, 337, 99/338, 385–391, 393, 399, 400–402; 219/521, 518, 537, 386, 492, 481, 494, 489, 497; 392/373, 375, 337, 407; 426/241, 243, 466, 523

(56) References Cited

U.S. PATENT DOCUMENTS

| | | | | |
|---|---|---|---|---|
| 2,503,960 A | * | 4/1950 | McCullough | 99/327 |
| 2,673,516 A | * | 3/1954 | Reichold | 99/327 |
| 2,878,748 A | * | 3/1959 | Stanek | 99/329 P |
| 3,869,970 A | * | 3/1975 | Eagle | 99/329 RT |
| 3,956,978 A | * | 5/1976 | Borley | 219/521 X |
| 4,154,151 A | * | 5/1979 | Mochizuki | 99/329 R |
| 4,188,865 A | * | 2/1980 | Bjarsch | 99/327 |
| 4,510,376 A | * | 4/1985 | Schneder | 219/492 |
| 4,755,656 A | * | 7/1988 | Charlesworth et al. | 219/492 X |
| 4,878,423 A | * | 11/1989 | Bikert et al. | 99/391 |
| 5,072,662 A | * | 12/1991 | Yip | 99/327 |
| 5,095,814 A | * | 3/1992 | Ott et al. | 99/391 |
| 5,598,765 A | * | 2/1997 | Yip | 99/391 X |

* cited by examiner

Primary Examiner—Timothy F. Simone
(74) Attorney, Agent, or Firm—Jackson Walker L.L.P.

(57) ABSTRACT

A toaster includes a toasting rack moveable between upper and lower positions. A lever arm with a handle is operable to move the toasting rack between the upper and lower positions. A user releasable latch retains the toaster rack in the upper position. When the latch is released the toasting rack falls to the lower position and a toasting cycle begins. At the end of a toasting cycle the toasting rack is moved to the upper position by manual operation of the handle.

8 Claims, 6 Drawing Sheets

TOASTER

FIELD OF THE INVENTION

The invention relates to toasters.

BACKGROUND OF THE INVENTION

Electric Toasters or so-called "pop-up" toasters are well known and typically included a toasting chamber with a spring biased toasting rack moveable between an upper position and a lower position. A handle is provided for moving the toasting rack to the lower position for a toasting cycle. At the same time as being moved to the lower position the toasting rack makes switch contacts for energising toaster elements and to begin the toasting cycle. An electric solenoid or bi-metal catch holds the toasting rack in the lower position for the period of the toasting cycle. At the end of the toasting cycle the toasting rack is released and the spring bias raises the toasting rack to its upper position to "pop-up" the toast.

A first problem associated with these known toasters is the effort require to move the toasting rack to its lower position and secure it with the solenoid or bi-metal catch. Relatively, the toasting rack has a long travel between the upper and lower positions and thus a relatively long stiff bias spring is required to bias it, This spring undergoes high tensional forces during the lower part of the toasting rack travel (near the lower position). A relatively large force is needed to force down the toasting rack to lower the slice of bread into the toast chamber and activate the toasting cycle.

A second problem is associated with the end of the toasting cycle. When the toasting cycle is complete the toasting rack is released and will move back to its upper position under influence of the biasing spring. The mechanical release of the toasting rack is inter-related with the switch contacts for the toasting elements. If a slice of bread (or toast) jams in the toasting. chamber the toasting rack will not rise after release. The toasting elements remain energised and there is the possibility of burning the toast and creating a fire hazard.

SUMMARY OF THE INVENTION

It is an object of the present invention to provide a toaster that requires little effort to lower the toasting rack. It is a further object of the present invention to provide a toaster that overcomes or ameliorates the risk of fire due to jamming. It is yet a further object of the present invention to provide the public with a. useful alternative to known toasters.

According to a first aspect of the invention there is provided a toaster including a toasting rack moveable between upper and lower positions, and a lever arm having a handle and being operable to move the toasting rack between the upper and lower positions, and wherein a user releasable latch retains the toaster rack in the upper position, and when the latch is released the toasting rack falls (is able to fall) to the lower position. At the end of a toasting cycle the toasting rack is moved to the to upper position by manual operation of the handle.

Preferably, the lever arm is pivotally mounted substantially at a balance point between the toasting rack and handle.

Preferably, the releasable latch is associated with a switch for energising toaster elements, when the latch is released the toaster elements are energised for a toasting cycle.

According to a second aspect of the invention there is provided a toaster including a toasting rack moveable between upper and lower positions, and a lever arm having a handle and being operable to move the toasting rack between the upper and lower positions, and wherein the lever arm is pivotally mounted substantially at a balance point between the toasting rack and handle, and a user releasable latch retains the toaster rack in the upper position, and when the latch is released the toasting rack falls(is able to fall) to the lower position and at the end of a toasting cycle the toasting rack is moved to the upper position by manual operation of the handle.

According to a third aspect of the invention there is provided a toaster including a toasting rack moveable between upper and lower positions, a lever arm having a handle and being operable to move the toasting rack between the upper and lower positions, a user releasable latch for retaining the toaster rack in the upper position, and a solenoid for retaining the latch in a released position, when the latch is released the toasting rack falls (is able to fall) to the lower position, the solenoid retaining the latch in the released position until the end of a toasting cycle. At the end of the toasting cycle the toasting rack is moved to the upper position by manual operation of the handle.

Further aspects of the invention will become apparent from the following description, which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

Figure 1:
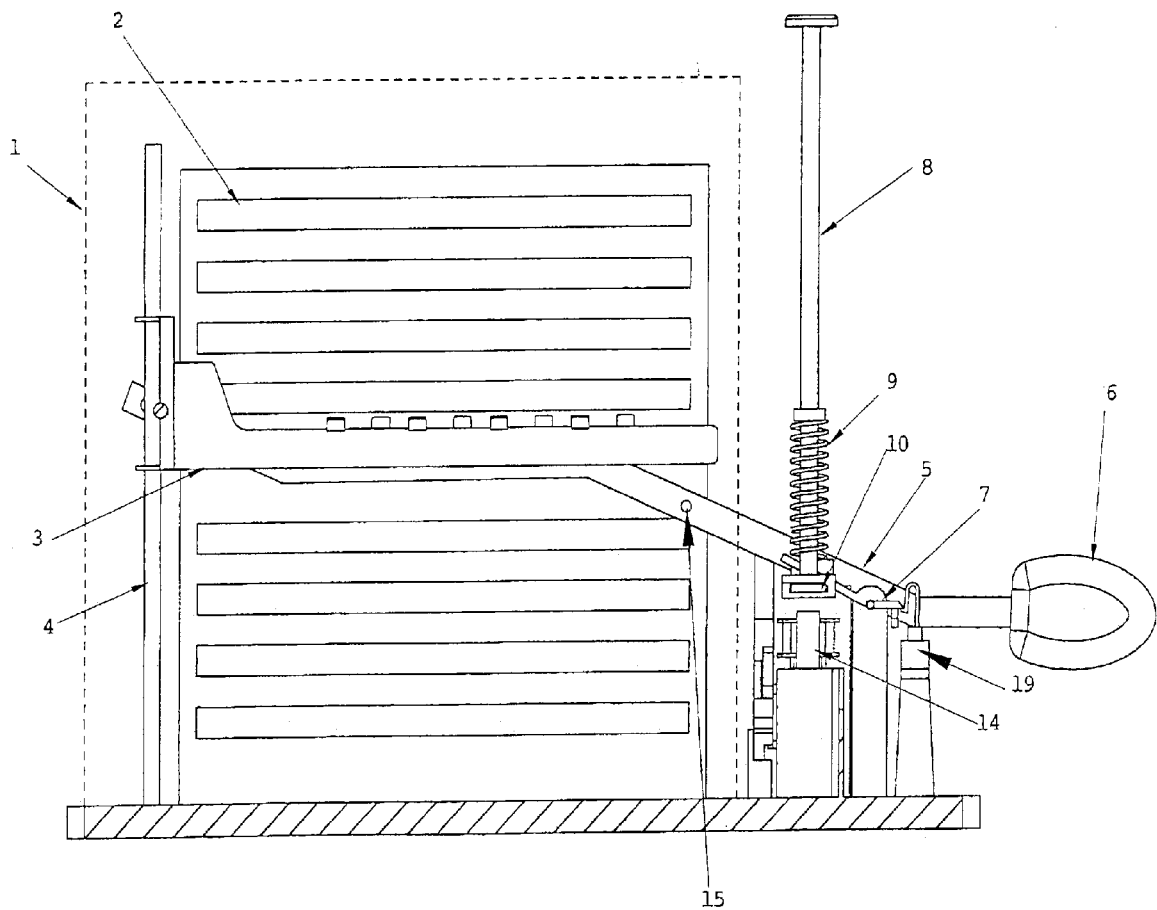
FIG. 1 illustrates the internal mechanism of a toaster in accordance with the invention when the toasting rack is in its upper position
Figure 2:
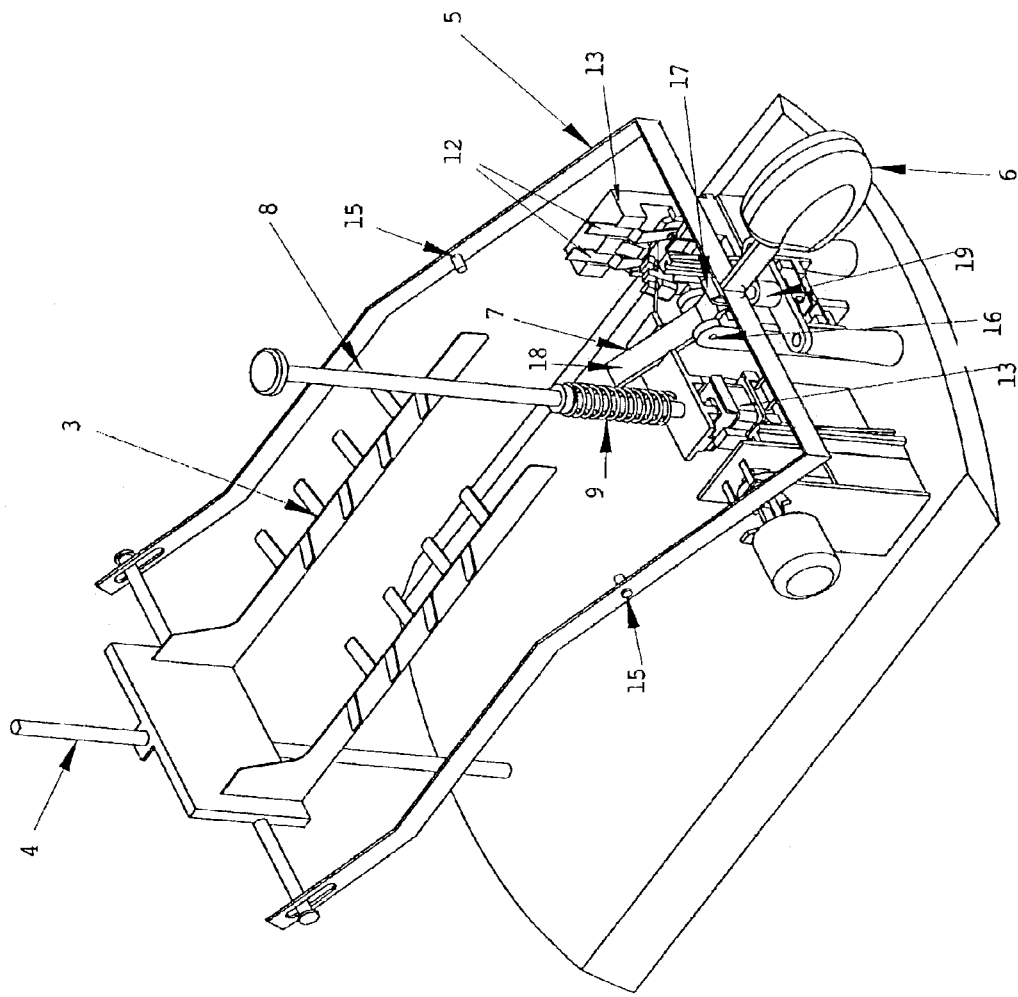
FIG. 2 illustrates a perspective view of the internal mechanism of the toaster when the toasting rack is in its upper position.

Referring to FIGS. 1 and 2, a toaster includes a toasting chamber 1 with toasting elements 2 on either side. A toasting rack 3 is moveable along a guide pin 4 between an upper position, which exposes a slice of bread outside the toasting chamber 1, and a lower position, which loads the slice of bread into the toasting chamber 1 for toasting.

Toasting rack 3 is connected to one end of a lever arm 5. At the other end of lever arm 5 is a handle 6. Lever arm 5 is mounted about a pivotal connection 15 and is operable to move the toasting rack 3 between its upper and lower positions in the toasting chamber 1. When lever arm 5 is pivoted by the user pressing cool touch handle 6 downwardly toasting rack 3 will move upwards along guide pin 4 towards its upper position. When lever arm 5 is pivoted by the user moving cool. touch handle 6 upwardly toasting rack 3 will move downwards along guide pin 4 towards its lower position.

In the preferred embodiment the pivot 15 of lever arm 5 is substantially in the equilibrium position between toasting rack 3 and handle 6 so that the lever arm 5 is substantially balanced. In the preferred embodiment the balance is slightly in favor of handle 6 so that it tends to fall to its lower position when the lever arm 5 is free to pivot. This will put the toasting rack 3 in its upper position. The balance is such that when a slice of bread is placed in the toasting rack it upsets the balance is favor of the toasting rack 3, which falls to its lower position if lever arm 5 is free to pivot. This substantial balance means that the effort required to move toasting rack 3 up and down by way of handle 6 is small.

One distinction of the toaster of the current invention is that the toasting rack is not biased in its upper position be a spring or other means, but as described above by way of the balance of level arm 5. A latch 7 is provided to hold the handle 6 of lever arm 5 in its lower position, and thus the toasting rack 3 in its upper position. The latch 7 is a shaped metal strip pivotally mounted, at pivot 16. First end 17 of latch 7 holds the handle 6 end of lever arm 5 in the lower position. With latch 7 engaged bread can be loaded in to the toasting rack 3.

A user release in the form of trigger switch 8 is located above latch 7. A soft biasing spring 9 is under trigger switch 8 to keep it in its upper position. A metal plate 10 is mounted on the base of the trigger switch 8. Plate 10 positions second end 18 of latch 7 upwardly holding the latch 7 "closed".

Figure 3:
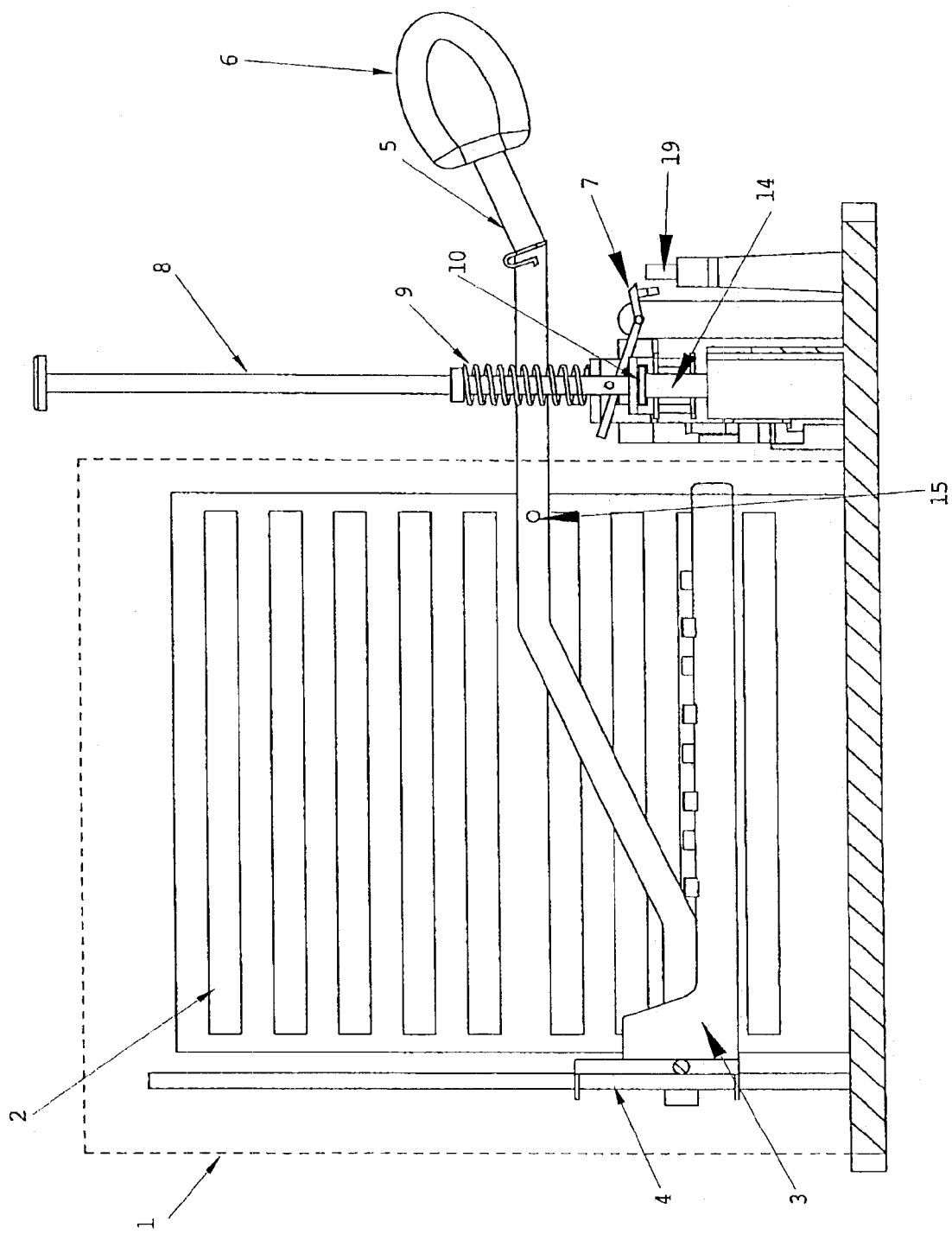
FIG. 3 illustrates the internal mechanism of the toaster when the toasting rack is in its lower position
Figure 4:
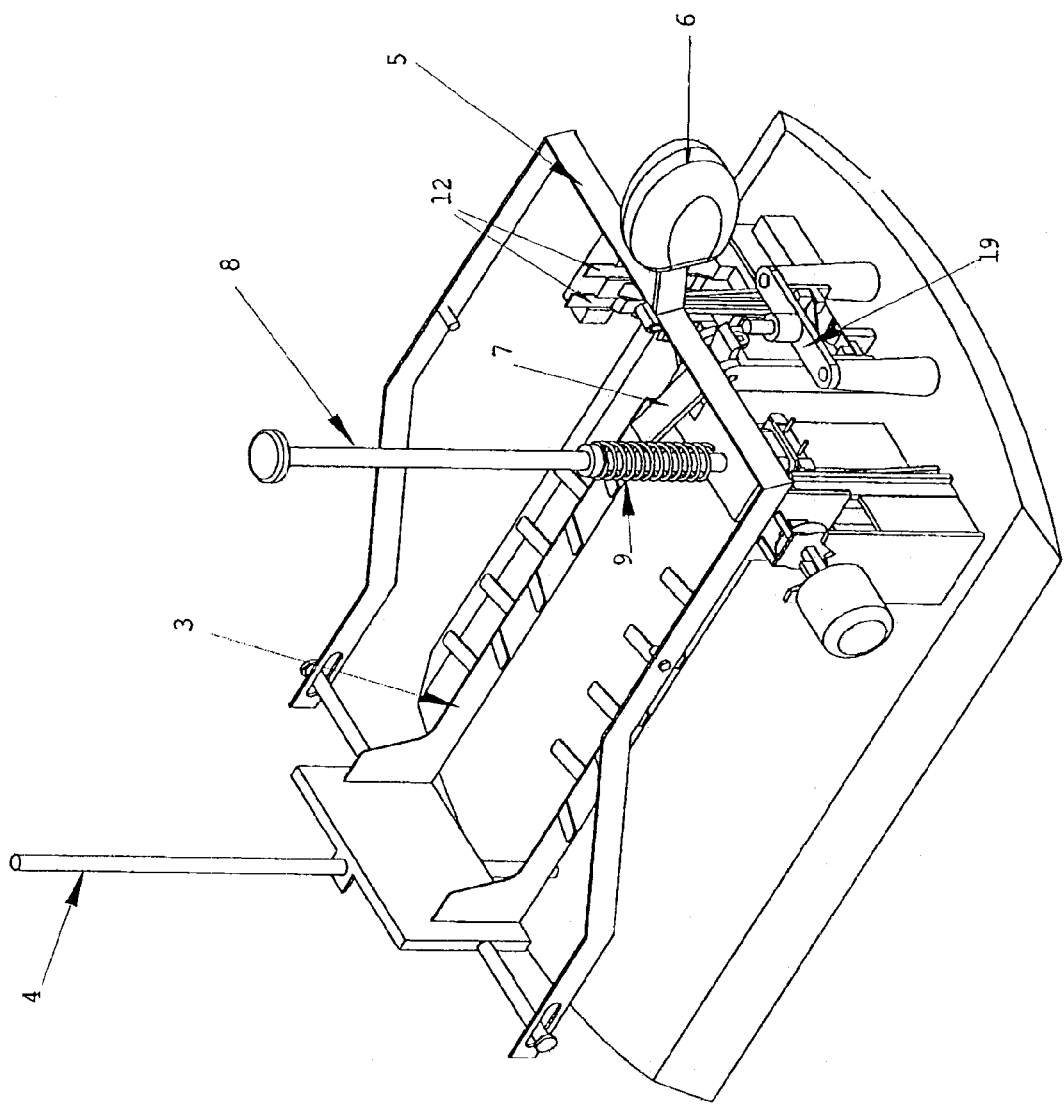
FIG. 4 illustrates a perspective view of the internal mechanism of the toaster when the toasting rack is in its lower position

Referring to FIGS. 3 and 4, when the user presses the trigger switch 8 downward the soft biasing element 9 will be slightly compressed and plate 10 moves downwards. This releases second end 18 of latch 7 which rotates about its pivot 16 to release the lever arm 5. The lever arm 5 is free to pivot and if there is one or more slices of bread in toasting rack 3 it falls to the lower position to load the bread into toasting chamber 1. The weight of the slice of bread shifts the balance of lever arm 5 in favor of toasting rack 3.

Figure 6:
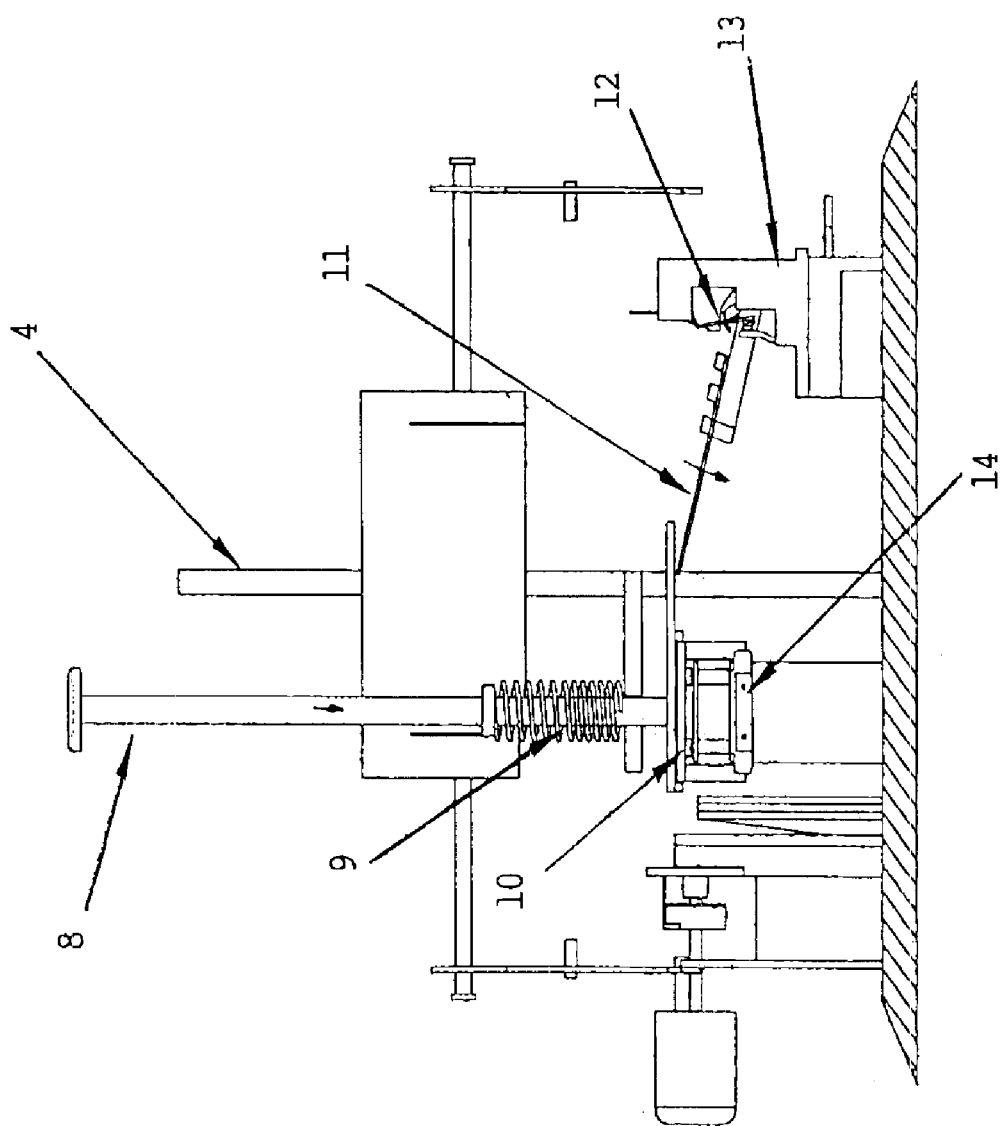
FIG. 6 illustrates the switching mechanism of the toaster when the trigger switch is forced downward.

Referring to FIG. 6, when the trigger switch 8 is in its lower position the trigger switch 8 will also press a spring lever 11 downwards. The spring lever 11 forces a contact plate 12 to be closed against a power switch 13. The switch 13 energises elements 2 and begins a toasting cycle. A solenoid 14 is energised to hold the trigger switch 8 in its lower position. The elements stay energised and the latch 7 stays in its released position.

The trigger switch 8 only travels a short distance to release latch 7 and move spring lever 11 to close contact plates 12 onto power switch 13. Therefore, the soft biasing spring 9 is only slightly compressed, and thus a much smaller compression force is needed for biasing element 9 against the movement of trigger switch 8. A smaller force is needed to put down the toast and begin the toasting cycle when compared to the force required in a prior art toaster.

Figure 5:
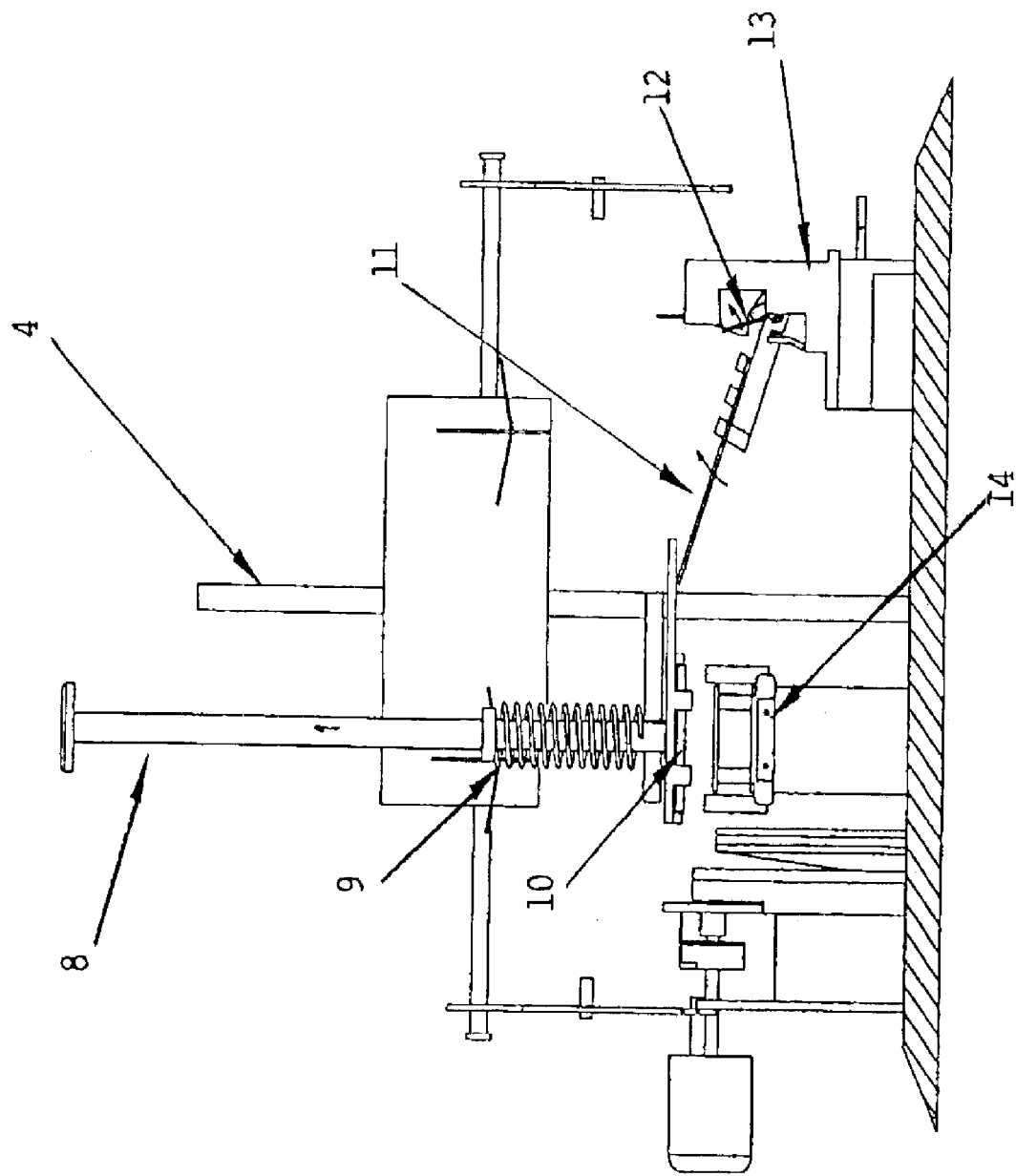
FIG. 5 illustrates a switching mechanism of a toaster when a trigger switch is released.

Referring to FIG. 5, when the toasting cycle is complete the stationary solenoid 14 is de-energised which releases the trigger switch 8. The trigger switch 8 will spring back to its upper position by soft biasing spring 9. In turn, the spring lever 11 will also be released and the contact plate 12 will be opened in power switch 13. The heating elements 2 will turn off as a result. Latch 7 is also moved to the closed position by plate 10.

Because there is no spring bias the toaster rack 3 stays in its lower position. When the user press the handle 6 downward the lever arm 5 will pivot and the toasting rack 3 will slide upward along guide pin 4 to its upper position. The slice of toast will be exposed outside toasting chamber 1. When the handle 6 of lever arm 5 is in its lower position the latching 7 will engage and hold lever arm 5 holding the toasting rack 3 in its upper position.

The movement of the trigger switch 8, spring level 11 and contact plates 12 of power switch 13 are totally separated from the movement of the lever arm 5 and toasting rack 3. This greatly reduces the risk of the failure to turn off the toasting elements if a slice of bread jams in the toasting chamber 1.

An additional advantage of the toaster of the current invention is that toast stays hot longer at the end of the toasting cycle as it remains within the toasting chamber until removed by the user.

The preferred embodiment of the invention also includes a cancel or stop button switch 19 disposed so as to be depressed by the handle 6 when it is in its lower position. When depressed the cancel button 19 opens the solenoid 14 circuit. If the solenoid 14 is energised it will be de-energised. Furthermore, the solenoid 14 cannot be energised while the handle 6 is in its lower position.

Cancel button 19 provides two functions. Firstly, it is a safety device in the case where a users pushes trigger switch 8 with no bread in the toasting rack 3. Without the weight of the bread the toasting rack will not fall to its lower position: the handle stays in its lower position and thus cancel button 19 stops the solenoid from latching closed to begin a toasting cycle. Secondly, it works as a normal cancel button. At anytime during the toasting cycle a user can depress handle 6 to its lower position to raise the "partially" toasted beard out of the toasting chamber. At the same time the solenoid 14 will be de-energised canceling the toasting cycle.

Where in the foregoing description reference has been made to integers or elements have known equivalents then such are included as if individually set forth herein.

Embodiments of the invention have been described, however it is understood that variations, improvement or modifications can take place without departure from the spirit of the invention or scope of the appended claims.

We claim:

1. A toaster comprising:
    a toasting rack moveable between upper and lower positions, and
    a lever arm having a handle and being operable to move the toasting rack between the upper and lower positions, and wherein
    a user releasable latch retains the toaster rack in the upper position, and when the latch is released the toasting rack is able to fall to the lower position.

2. A toaster as claimed in claim 1 wherein at the end of a toasting cycle the toasting rack is moved to the upper position by manual operation of the handle.

3. A toaster as claimed in claim 1 wherein the lever arm is pivotally mounted substantially at a balance point between the toasting rack and handle such that the toasting rack falls to the lower position only when a splice of bread is present on it.

4. A toaster as claimed in claim 1 wherein the releasable latch is associated with a switch for energising toaster elements, when the latch is released the toaster elements are energised for a toasting cycle.

5. A toaster comprising:
    a toasting rack moveable between upper and lower positions, and
    a lever arm having a handle and being operable to move the toasting rack between the upper and lower positions, and wherein the lever arm is pivotally mounted substantially at a balance point between the toasting rack and handle and a user releasable latch retains the toaster rack in the upper position, and when the latch is released the toasting rack falls to the lower position and a toasting cycle begins, at the end of a toasting cycle the toasting rack is moved to the upper position by manual operation of the handle.

6. A toaster as claimed in claim 5 wherein the releasable latch is associated with a switch for energising toaster elements, when the latch is released the toaster elements are energised for the toasting cycle.

7. A toaster comprising:

a toasting rack moveable between upper and lower positions, a lever arm having a handle and being operable to move the toasting rack between the upper and lower positions, a user releasable latch for retaining the toaster rack in the upper position, and a solenoid for retaining the latch in a released position, when the latch is released the toasting rack falls to the lower position, the solenoid retaining the latch in the released position until the end of a toasting cycle.

8. A toaster as claimed in claim 7 wherein at the end of the toasting cycle the toasting rack is moved to the upper position by manual operation of the handle.

* * * * *